United States Patent
Wu

(10) Patent No.: US 12,284,540 B2
(45) Date of Patent: Apr. 22, 2025

(54) METHOD FOR CELL MANAGEMENT, TERMINAL, AND NETWORK-SIDE DEVICE

(71) Applicant: VIVO MOBILE COMMUNICATION CO., LTD., Guangdong (CN)

(72) Inventor: Yumin Wu, Chang'an Dongguan (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 0 days.

(21) Appl. No.: 17/110,159

(22) Filed: Dec. 2, 2020

(65) Prior Publication Data
US 2021/0092630 A1   Mar. 25, 2021

Related U.S. Application Data

(63) Continuation of application No. PCT/CN2019/089156, filed on May 30, 2019.

(30) Foreign Application Priority Data

Jun. 15, 2018   (CN) .......................... 201810622023.4

(51) Int. Cl.
*H04W 24/10*   (2009.01)
*H04W 36/00*   (2009.01)
(Continued)

(52) U.S. Cl.
CPC ....... *H04W 24/10* (2013.01); *H04W 36/0058* (2018.08); *H04W 36/0072* (2013.01); *H04W 36/362* (2023.05); *H04W 36/24* (2013.01)

(58) Field of Classification Search
CPC ............. H04W 24/10; H04W 36/0058; H04W 36/0072; H04W 36/0085; H04W 36/24; H04W 36/36
See application file for complete search history.

(56) References Cited

U.S. PATENT DOCUMENTS

| | | | |
|---|---|---|---|
| 9,155,014 | B2 | 10/2015 | Tenny et al. |
| 2010/0124203 | A1 | 5/2010 | Tenny et al. |

(Continued)

FOREIGN PATENT DOCUMENTS

| | | |
|---|---|---|
| CN | 101370266 A | 2/2009 |
| CN | 102113374 A | 6/2011 |

(Continued)

OTHER PUBLICATIONS

Chinese Office Action issued in corresponding application No. 201810622023.4, dated Jun. 2, 2020.

(Continued)

*Primary Examiner* — Lester G Kincaid
*Assistant Examiner* — Dung L Lam
(74) *Attorney, Agent, or Firm* — Price Heneveld LLP

(57) ABSTRACT

A method for cell management, a terminal, and a network-side device are provided. The method for cell management applied to the terminal includes: receiving configuration information sent by the network-side device, where the configuration information includes trigger conditions for triggering a cell management operation and measurement objects; performing a measurement operation corresponding to a target trigger condition on a target measurement object, to obtain a measurement result; if the measurement result satisfies the target trigger condition, performing a management operation on a target cell, where the target measurement object is any one of the measurement objects included in the configuration information, and the target trigger condition is associated with the target measurement object.

19 Claims, 5 Drawing Sheets

---

Receive configuration information sent by a network-side device, where the configuration information includes trigger conditions for triggering a cell management operation and measurement objects — 301

Perform a measurement operation corresponding to a target trigger condition on a target measurement object, to obtain a measurement result — 302

If the measurement result satisfies the target trigger condition, perform a management operation on a target cell — 303

(51) Int. Cl.
*H04W 36/36* (2009.01)
*H04W 36/24* (2009.01)

(56) References Cited

U.S. PATENT DOCUMENTS

| | | | |
|---|---|---|---|
| 2010/0142488 A1 | 6/2010 | Zhang et al. | |
| 2011/0269469 A1 | 11/2011 | Xiao et al. | |
| 2012/0300657 A1 | 11/2012 | Jung et al. | |
| 2013/0016613 A1 | 1/2013 | Huang et al. | |
| 2013/0115958 A1* | 5/2013 | Wei | H04W 72/542 455/437 |
| 2014/0126545 A1 | 5/2014 | Tamura et al. | |
| 2015/0180634 A1 | 6/2015 | Hoshino et al. | |
| 2016/0044569 A1* | 2/2016 | Lunden | H04W 36/0058 370/331 |
| 2016/0353295 A1* | 12/2016 | Wu | H04L 5/0051 |
| 2018/0167856 A1 | 6/2018 | Li et al. | |
| 2019/0207662 A1* | 7/2019 | Zhou | H04W 24/08 |
| 2021/0068016 A1* | 3/2021 | Shi | H04W 36/08 |

FOREIGN PATENT DOCUMENTS

| | | |
|---|---|---|
| CN | 102215526 A | 10/2011 |
| EP | 2944110 A1 | 11/2015 |
| JP | 2012509619 A | 4/2012 |
| JP | 2017511628 A | 4/2017 |
| WO | 2013024574 A1 | 2/2013 |
| WO | 2013/045698 A1 | 4/2013 |
| WO | 2014/020828 A1 | 2/2014 |
| WO | 2014/109606 A1 | 7/2014 |
| WO | 2019218990 A1 | 11/2019 |

OTHER PUBLICATIONS

International Search Report and Written Opinion issued in corresponding application No. PCT/CN2019/089156, dated Dec. 24, 2020.
LG Electronics Inc., Conditional Handover Procedure, R2-1802693, 3GPP TSG-RAN2#101, Athens, Greece, Feb. 26-Mar. 2, 2018.
Ericsson, Conditional Handover, R2-1803336, 3GPP TSG-RAN WG2 #101, Athens, Greece, Feb. 26-Mar. 2, 2018.
European Search Report issued in corresponding application No. 19820615.3, dated Jun. 14, 2021.
Japanese Office Action issued in corresponding application No. 2020-570002, dated Feb. 15, 2022.
JP Office Action dated Apr. 24, 2023 as received in Application No. 2020-570002.
EP Office Action dated May 10, 2023 as received in Application No. 19820615.3.

* cited by examiner

METHOD FOR CELL MANAGEMENT, TERMINAL, AND NETWORK-SIDE DEVICE

CROSS-REFERENCE TO RELATED APPLICATIONS

This application is a continuation application of PCT Application No. PCT/CN2019/089156 filed on May 30, 2019, which claims priority to Chinese Patent Application No. 201810622023.4 filed in China on Jun. 15, 2018, disclosure of which are incorporated herein by reference in their entireties.

TECHNICAL FIELD

Embodiments of this disclosure relate to the field of communications technologies, and in particular, to a method for cell management, a terminal, and a network-side device.

BACKGROUND

In the related art, a cell may be managed in a condition-triggered manner to improve cell management efficiency. A management manner may include cell addition, cell deletion, cell modification, or cell handover.

In a conditional cell management manner, a network-side device prepares one or more candidate target cells for a terminal in advance based on a measurement result reported by the terminal, and sends a conditional management command to the terminal, where the conditional management command includes a list of candidate target cells, management trigger conditions corresponding to the candidate target cells, resource configurations corresponding to the candidate target cells, and the like. The terminal does not perform cell management immediately after receiving the conditional management command, but performs cell management for a candidate cell, only after determining that the candidate cell satisfies a preset management trigger condition.

As can be seen, the conditional cell management manner in the related art involves complex operations.

SUMMARY

According to a first aspect, an embodiment of this disclosure provides a method for cell management, applied to a terminal, where the method includes:
receiving configuration information sent by a network-side device, where the configuration information includes trigger conditions for triggering a cell management operation and measurement objects;
performing a measurement operation corresponding to a target trigger condition on a target measurement object, to obtain a measurement result; and
if the measurement result satisfies the target trigger condition, performing a management operation on a target cell, where
the target measurement object is any one of the measurement objects included in the configuration information, and the target trigger condition is associated with the target measurement object.

According to a second aspect, an embodiment of this disclosure provides a method for cell management, applied to a network-side device, where the method includes:
sending configuration information to a terminal, where the configuration information includes trigger conditions for triggering a cell management operation and measurement objects.

According to a third aspect, an embodiment of this disclosure further provides a terminal, where the terminal includes:
a receiving module, configured to receive configuration information sent by a network-side device, where the configuration information includes trigger conditions for triggering a cell management operation and measurement objects;
a measurement module, configured to perform a measurement operation corresponding to a target trigger condition on a target measurement object, to obtain a measurement result; and
a first management module, configured to: if the measurement result satisfies the target trigger condition, perform a management operation on a target cell, where
the target measurement object is any one of the measurement objects included in the configuration information, and the target trigger condition is associated with the target measurement object.

According to a fourth aspect, an embodiment of this disclosure further provides a network-side device, where the network-side device includes:
a first sending module, configured to send configuration information to a terminal, where the configuration information includes trigger conditions for triggering a cell management operation and measurement objects.

According to a fifth aspect, an embodiment of this disclosure further provides a terminal, where the terminal includes: a processor, a memory, and a computer program stored in the memory and capable of running on the processor, where when the computer program is executed by the processor, the steps of the foregoing method for cell management applied to a terminal are implemented.

According to a sixth aspect, an embodiment of this disclosure further provides a network-side device, where the network-side device includes: a processor, a memory, and a computer program stored in the memory and capable of running on the processor, where when the computer program is executed by the processor, the steps of the foregoing method for cell management applied to a network-side device are implemented.

According to a seventh aspect, an embodiment of this disclosure further provides a computer-readable storage medium, where the computer-readable storage medium stores a computer program, and when the computer program is executed by a processor, the steps of the foregoing method for cell management applied to a terminal are implemented, or the steps of the foregoing method for cell management applied to a network-side device are implemented.

BRIEF DESCRIPTION OF THE DRAWINGS

To describe the technical solutions in the embodiments of this disclosure more clearly, the following briefly describes the accompanying drawings for describing the embodiments of this disclosure. Apparently, the accompanying drawings in the following description show merely some embodiments of this disclosure, and a person of ordinary skill in the art may still derive other drawings from these accompanying drawings without creative efforts.

DETAILED DESCRIPTION OF EMBODIMENTS

The following clearly describes the technical solutions in the embodiments of this disclosure with reference to the accompanying drawings in the embodiments of this disclosure. Apparently, the described embodiments are some rather than all of the embodiments of this disclosure. All other embodiments obtained by a person of ordinary skill in the art based on the embodiments of this disclosure without creative efforts shall fall within the protection scope of this disclosure.

The terms "first", "second", and the like in this specification and claims of this application are used to distinguish between similar objects rather than to describe a specific order or sequence. It should be understood that the data termed in such a way are interchangeable in proper circumstances so that the embodiments described herein can be implemented in orders other than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or inherent to the process, method, system, product, or device. In addition, in the specification and claims, the use of "and/or" represents presence of at least one of the connected objects, for example, "A and/or B and/or C" indicates that the following seven cases: only A, only B, only C, both A and B, both B and C, both A and C, or all A, B, and C.

For ease of understanding, the following describes some terms used in the embodiments of this disclosure.

Conditional Handover:

In the embodiments of this disclosure, a conditional handover process may include the following steps.

Step S1: A source node sends a handover request (Handover Request, HO Request) to one or more target nodes.

Figure 1:
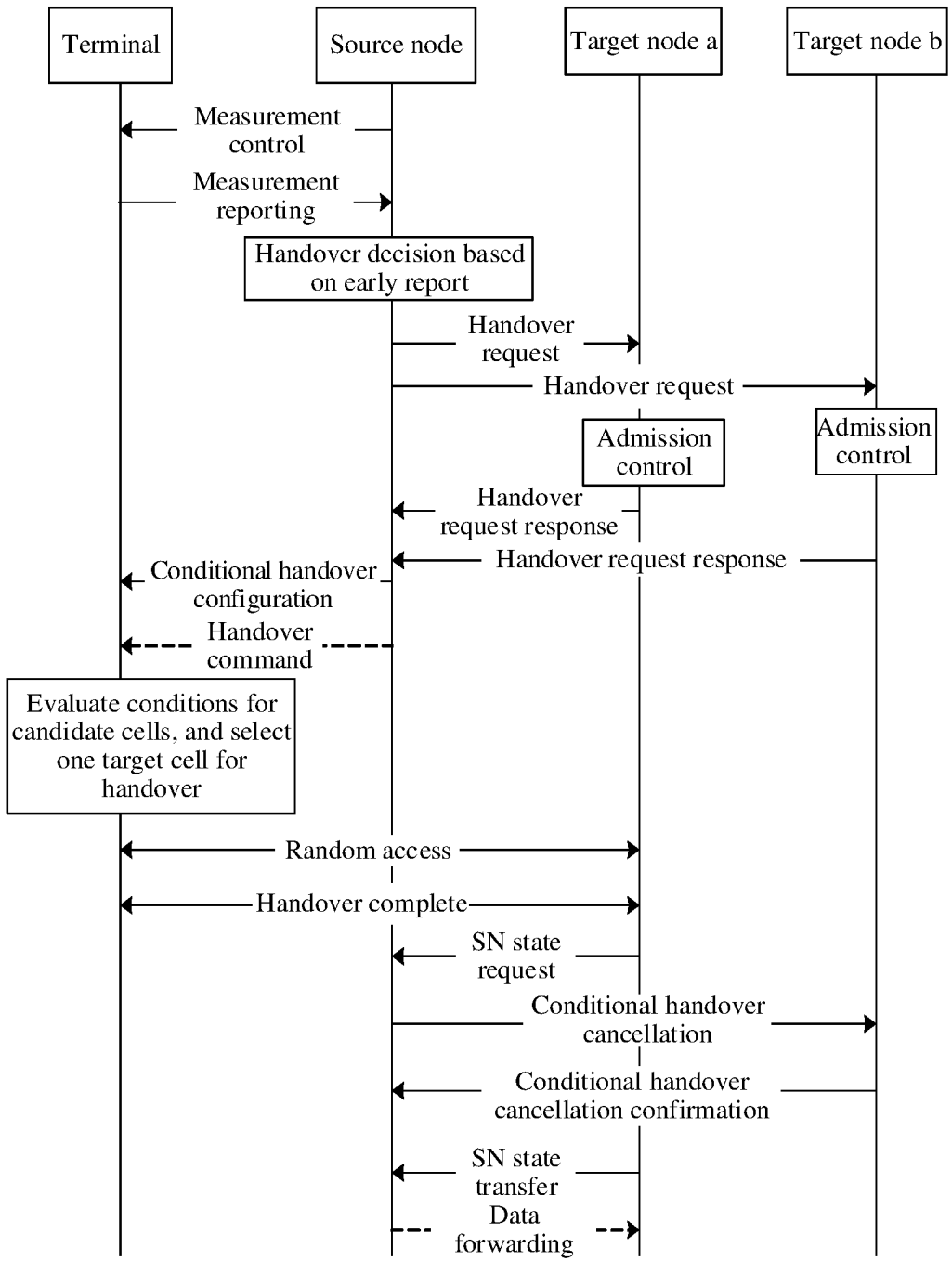
FIG. 1 is a flowchart of conditional handover in the related art.

For example, in FIG. 1, the source node sends the handover request to a target node a and a target node b.

Step S2: The target node feeds back handover acknowledgment information, namely, a handover request response (HO Request ACK) to the source node.

As shown in FIG. 1, the target node a and the target node b each send a handover request response to the source node.

Step S3: The source node sends a conditional handover configuration (Conditional HO Configuration) to a terminal.

In this step, the source node sends conditional handover configuration information to the terminal, along with a configuration information reservation (namely, Resource Reservation).

Step S4: The terminal evaluates conditions for candidate cells, and selects one target cell for handover.

In this step, the terminal evaluates whether the conditions for the candidate cells are satisfied, and may select one target cell that satisfies a condition for handover.

As shown in FIG. 1, the terminal may evaluate whether conditions for the target node a and the target node b are satisfied, and when the terminal determines that a condition for the target node a is satisfied, the terminal may initiate a random access procedure to the target node a.

Step S5: The terminal initiates the random access procedure in a selected target cell.

It may be understood that the random access may include contention-free (Contention Free) random access, or contention-based random access (namely, Contention based Random Access), or the like.

As shown in FIG. 1, the terminal selects the target node a and initiates random access to the target node a.

Step S6: The terminal sends handover complete information to the selected target node.

As shown in FIG. 1, the terminal sends the handover complete information (namely, HO Complete) to the target node a.

Step S7: The source node sends a conditional handover cancellation command to other unselected target nodes.

As shown in FIG. 1, the source node sends the conditional handover cancellation command (namely, Conditional HO Cancellation) to the target node b.

Step S8: The other unselected target nodes send a conditional handover cancellation confirmation command to the source node.

As shown in FIG. 1, the target node b sends the conditional handover cancellation confirmation command (namely, Conditional HO Cancellation Confirmation) to the source node.

Dual Connectivity:

In a 5th generation (5th-Generation) system, a dual connectivity (DC) architecture is used for a terminal. The DC architecture includes two cell groups: a master cell group (MCG) and a secondary cell group (SCG). The MCG corresponds to master nodes (MN) on a network side, and the SCG corresponds to secondary nodes (SN) on the network side. The MCG includes a primary cell (PCell) and a secondary cell (SCell). The SCG includes a primary secondary cell (PSCell) and a secondary cell SCell. The PCell and the PSCell may also be collectively referred to as an SpCell.

Figure 2:
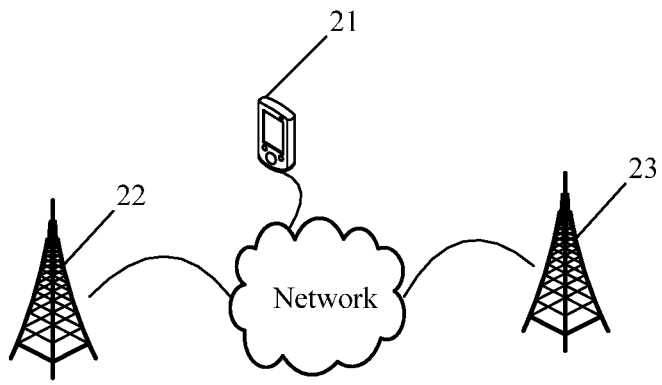
FIG. 2 is a structural diagram of a network system to which an embodiment of this disclosure may be applied.

FIG. 2 is a structural diagram of a network system to which an embodiment of this disclosure is applicable. As shown in FIG. 2, the network system includes a terminal 21, a source node 22, and a target node 23, where the terminal 21, the source node 22, and the target node 23 may communicate with each other over a network.

In this embodiment of this disclosure, the terminal 21 may also be referred to as a terminal or user equipment (UE). The terminal 21 may be a terminal-side device such as a mobile phone, a tablet personal computer (Tablet Personal Computer), a laptop computer (Laptop Computer), a personal digital assistant (PDA), a mobile internet device (MID), a wearable device (Wearable Device), or a vehicle-mounted device. It should be noted that a specific type of the terminal 21 is not limited in this embodiment of this disclosure.

The source node 22 may be one of network nodes to which the terminal 21 is currently connected. For example, if the network nodes to which the terminal 21 is currently connected include an MN and an SN, the source node 22 may be one of the MN and the SN.

The target node 23 may be one of the network nodes to which the terminal 21 is currently connected, or may be a network node to which the terminal 21 is currently not connected. In this embodiment of this disclosure, cell configuration performed by the terminal 21 may include, but is not limited to, at least one configuration of cell addition, cell deletion, cell modification, and cell handover. Therefore, in a process of cell configuration, the terminal 21 may establish a connection to the target node 23, or delete a connection between the terminal 21 and the target node 23, or modify configuration information of the target node 23.

In addition, the network structure applied in this embodiment of this disclosure may include one or more target nodes 23, and one target node 23 is used as an example in the figure.

The network node may be a base station of 5G or a later release (for example, a 5G NR NB), or a base station in another communications system, or may be referred to as a NodeB, an evolved NodeB, or an MN, or an SN, or other terms in the art. Provided that the same technical effects are achieved, the base station is not limited to a specific technical term.

The method for cell management in the embodiments of this disclosure may be applied to a conditional handover procedure, that is, the source node 22 and the target node 23 may be a source base station and a target base station respectively in the conditional handover procedure; or the method for cell management in the embodiments of this disclosure may be applied to a DC architecture, that is, the source node 22 and the target node 23 may be a source SN and a target SN respectively in the DC architecture, or a source MN and a target SN respectively in the DC architecture.

It should be noted that specific functions of the terminal 21, the source node 22, and the target node 23 in this embodiment of this disclosure are described in detail by using the following embodiments.

Figure 3:
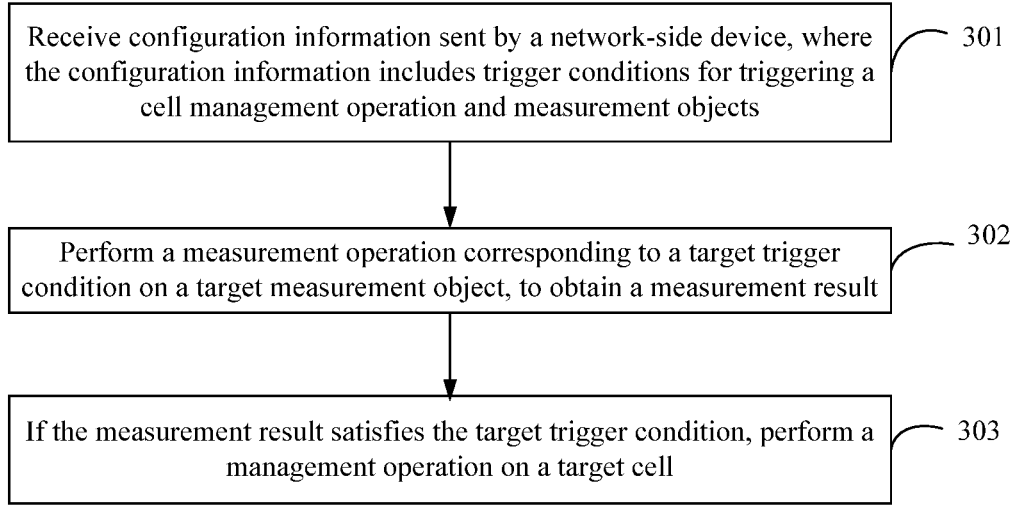
FIG. 3 is a flowchart 1 of a method for cell management according to an embodiment of this disclosure.

FIG. 3 is a flowchart 1 of a method for cell management according to an embodiment of this disclosure. The method for cell management in this embodiment is applied to a terminal. As shown in FIG. 3, the method for cell management in this embodiment includes the following steps.

Step 301: Receive configuration information sent by a network-side device, where the configuration information includes trigger conditions for triggering a cell management operation and measurement objects.

In this embodiment, the network-side device may send the configuration information by using a radio resource control (RRC) message. Certainly, this is not limited in this embodiment of this disclosure. For example, the configuration information may also be sent by using another downlink message.

It should be noted that the trigger condition (or referred to as a trigger event, event) in the configuration information is used to indicate that the terminal can perform the cell management operation when the trigger condition is satisfied. The management operation may include, but is not limited to, at least one of cell addition, cell deletion, cell change, and cell handover.

The trigger condition in the configuration information may include, but is not limited to, a threshold for triggering the cell management operation. Further, the trigger condition in the configuration information may further include a measurement parameter for triggering the cell management operation, where the measurement parameter may include, but is not limited to, at least one of reference signal received power (RSRP), reference signal received quality (RSRQ), and a signal to interference plus noise ratio (SINR).

In practical application, the trigger condition may be that a measurement parameter, for example, an RSRP measurement result, of one or more cells satisfies a network-configured threshold. For example, an RSRP measurement result of a serving cell 1 is lower than the threshold, and an RSRP measurement result of a neighboring cell 2 is higher than the threshold.

The measurement object (measure Object) in the configuration information may include, but is not limited to, a frequency. Optionally, the measurement object may further include a cell.

In addition, the configuration information may include one or more trigger conditions, and may further include one or more measurement objects, and there is an association relationship between the trigger condition and the measurement object.

In specific implementation, association information (or referred to as association relationship information), for example, a measurement ID (measure ID), for representing the association relationship between the trigger condition and the measurement object may be specified by a protocol, that is, the information about an association between the trigger condition and the measurement object is predefined in the protocol. For example, the system may directly solidify the association information in the communication protocol used between the network-side device and the terminal. In this way, the terminal can directly read the association information from the communication protocol to determine the association relationship between the trigger condition and the measurement object, instead of determining the association relationship between the trigger condition and the measurement object according to an indication of the network-side device, thereby saving system overheads.

Certainly, the association relationship may alternatively be configured by the network-side device in the configuration information, that is, the configuration information further includes the information about an association between the trigger condition and the measurement object. Different from the association relationship being predefined in the protocol, this can improve flexibility of association between the trigger condition and the measurement object.

In an optional implementation, the configuration information in this step may include a list of trigger conditions, a list of measurement objects, and a list of association relationships. Specifically, the list of trigger conditions includes one or more trigger conditions, such as an event 1 and an event 2; the list of measurement objects includes one or more measurement objects, such as a measure Object 1 and a measure Object 2; and the list of association relationships includes association relationships between the trigger conditions and the measurement objects, for example, a measure ID 1 and a measure ID 2, where the measure ID 1 may identify association between the event 1 and the measure Object 1, and the measure ID 2 may identify association between the event 2 and the measure Object 2.

It should be understood that the trigger condition included in the configuration information may be understood as identification information (condition ID) of the trigger condition. Therefore, the trigger condition can be identified by using the identification information of the trigger condition, or the trigger condition and the measurement object can be associated by using the identification information.

Likewise, the measurement object included in the configuration information may be understood as identification information (measure Object ID) corresponding to the measurement object. Therefore, the measurement object can be identified by using the identification information, or the measurement object and the trigger condition can be associated by using the identification information.

Certainly, for the trigger condition included in the configuration information, the configuration information may include only the trigger condition, or may not only include the trigger condition, but also include the identification information corresponding to the trigger condition.

Optionally, the receiving configuration information sent by a network-side device may include:

receiving configuration information sent by a source node; or receiving configuration information sent by a target node through the source node.

In an implementation of receiving the configuration information sent by the source node, before the source node sends the configuration information, the source node may determine the trigger condition through negotiation with one or more target nodes. The negotiation may be that the source node performs signaling exchange with the target node to determine the trigger condition. In addition, because the trigger condition is determined by the source node through negotiation with the target node, the trigger condition corresponds to a cell of the target node, that is, the trigger condition may trigger the terminal to perform a management operation on the cell of the target node.

For example, after receiving a trigger condition for a cell of one or more target nodes, the source node associates the trigger condition with a measurement object, and after association, may send configuration information including the trigger condition and the measurement object by using an RRC message. It should be noted that one target node may correspond to a trigger condition for one or more cells.

In this implementation, by receiving the configuration information sent by the source node, the terminal can receive, through the source node, the trigger condition and the measurement object that correspond to the one or more target nodes, thereby reducing transmission overheads.

Likewise, in an implementation of receiving the configuration information sent by the target node through the source node, the target node may send the configuration information to the terminal through the source node. Before sending a trigger condition, the target node may negotiate with the source node to determine a trigger condition and a measurement object in the configuration information.

For example, after receiving one or more pieces of request information that are sent by the source node for cell management to be triggered based on a condition, the target node may associate a trigger condition with a measurement object, include the associated trigger condition and measurement object in the configuration information, and send the configuration information to the source node; the source node sends the configuration information to the terminal.

In this implementation, the configuration information sent by the target node through the source node is received, and therefore the configuration information may be delivered by the target node. The configuration information may be transparent to the source node, and the source node only needs to forward or transparently transmit the configuration information. Therefore, complexity of the source node can be reduced, and power consumption of the source node can be reduced.

It should be noted that the source node and the target node may be a source base station and a target base station respectively in a cell management procedure, such as a cell handover procedure, or a source SN and a target SN respectively in DC, or a source MN and a target SN respectively in DC, or the like. This is not limited in this embodiment of this disclosure.

Step 302: Perform a measurement operation corresponding to a target trigger condition on a target measurement object, to obtain a measurement result.

The target measurement object is any one of the measurement objects included in the configuration information, and the target trigger condition is associated with the target measurement object.

For ease of understanding, as an example, the target measurement object is a frequency 1 indicated by a measure Object 1, and the target trigger condition associated with the target measurement object is an event 1 indicating an RSRP threshold. In specific implementation, the terminal may perform measurement on the frequency 1 indicated by the measure Object 1, and an obtained measurement result is an RSRP value indicated by the event 1.

Step 303: If the measurement result satisfies the target trigger condition, perform a management operation on a target cell.

Optionally, the target cell corresponds to the target measurement object. It should be noted that if the target measurement object is represented as a frequency, the target cell is a cell corresponding to the frequency; or if the target measurement object is represented as a cell, the cell is the target cell.

For ease of understanding, still as an example, the target measurement object is a frequency 1 indicated by a measure Object 1, and the target trigger condition associated with the target measurement object is an event 1 indicating an RSRP threshold. Assuming that an RSRP value corresponding to a measurement result obtained by measuring the frequency 1 indicated by the measure Object 1 exceeds the RSRP threshold indicated by the event 1, it can be considered that the measurement result satisfies the target trigger condition, and a management operation is performed on a target cell corresponding to the target measurement object.

A type of the management operation may include, but is not limited to, at least one of addition, deletion, modification, and handover, and may specifically depend on a configuration of the network-side device. This is not limited in this embodiment of this disclosure.

According to the method for cell management in this embodiment, the configuration information sent by the network-side device and received by the terminal includes trigger conditions for triggering a cell management operation. In this way, after receiving the configuration information, the terminal can perform the measurement operation corresponding to the target trigger condition on the target measurement object, and perform the management operation on the target cell when the measurement result corresponding to the measurement operation satisfies the target trigger condition. In other words, in order to trigger the terminal to perform the measurement operation and the management operation, the network-side device merely needs to send the configuration information, thereby simplifying operations of conditional cell management and saving system resources.

In addition, in this embodiment of this disclosure, triggering cell management based on a condition can be implemented. The terminal may perform a management operation on a target cell when a measurement result corresponding to a target trigger condition satisfies the target trigger condition. This can improve flexibility of a cell management operation, and further improve communication performance of the terminal.

In this embodiment of this disclosure, it is taken into consideration that in the related art, the terminal needs to continuously perform cell measurement and report a measurement result before performing a cell management operation, so that the network-side device configures an appropriate cell management operation for the terminal based on the measurement result. Moreover, in the related art, the network-side device establishes association relationship configuration information for a measurement report configuration (report Configuration ID) and a measurement object (measure Object ID) by using a measurement identifier (measure ID), and sends the association relationship configuration information to the terminal. The terminal determines that if there is the association relationship configuration information, the terminal starts to measure the measurement object specified by the association relationship configuration information, and reports a measurement result to the network-side device after a reporting condition for the measurement report configuration is satisfied. The measurement result is reported frequently, resulting in high signaling overheads.

To resolve the problem, the method for cell management in this embodiment of this disclosure may further include:
  obtaining indication information; and
  performing a target operation corresponding to the indication information for the obtained measurement result.

The indication information is used to indicate whether to report the measurement result, and the target operation is a reporting operation or an operation of skipping reporting.

In specific implementation, if the indication information is used to instruct to report the measurement result, the reporting operation is performed for the obtained measurement result; or if the indication information is used to indicate no measurement report, the operation of skipping reporting is performed for the obtained measurement result. It should be understood that the operation of skipping reporting performed for the obtained measurement result may be understood as: the measurement result obtained through measurement is not to be reported.

In this way, after obtaining the measurement result corresponding to the measurement operation, the terminal determines, based on the indication information, whether to perform measurement reporting. Compared with the related art in which a reporting operation is performed immediately when the measurement result satisfies a reporting trigger condition, this can reduce times of measurement reporting, reduce signaling overheads, and save system resources.

Optionally, the indication information may be configured by the network-side device or specified by a protocol.

In an implementation of the indication information being specified by the protocol, the system may directly solidify the indication information in the communication protocol used between the network-side device and the terminal. In this way, the terminal can directly read the indication information from the communication protocol to determine whether to report the measurement object, and perform a target operation corresponding to the indication information for the obtained measurement result, instead of determining the indication information according to an indication of the network-side device, thereby saving system overheads.

In an implementation of the indication information being configured by the network-side device, further, the network-side device may configure the indication information in the configuration information. In this way, different from the indication information being specified by the protocol, the network-side device can flexibly configure the indication information, thereby improving flexibility of configuration of the indication information.

Further, the indication information is used to indicate whether to report a measurement result satisfying the trigger condition.

In this implementation, for a measurement result that does not satisfy the trigger condition, the terminal may not report the measurement result. For a measurement result satisfying the trigger condition, the terminal may determine, based on the indication information, whether to report the measurement result. This can further reduce times of measurement reporting, reduce signaling overheads, and save system resources.

In this embodiment of this disclosure, in order to make the terminal clearly know a type of the management operation, optionally, the configuration information further includes management information corresponding to the target trigger condition, where the indication information is used to indicate whether to report a measurement result satisfying the target trigger condition in a case in which the management operation is a management operation corresponding to the management information.

The management information is used to indicate the type of the management operation, which includes, but is not limited to, at least one of addition, deletion, modification, and handover.

In this implementation, the indication information is used to indicate whether to report the obtained measurement result in a case in which the measurement result satisfies the target trigger condition and the management operation performed by the terminal on the target cell is a management operation corresponding to the management information.

For example, the indication information may be used to indicate whether to report the obtained measurement result in a case in which the measurement result satisfies a target trigger condition event 1 and a management operation performed on the target cell is a management operation corresponding to management information configuration 1.

It can be learned that in this implementation, if the indication information is used to instruct to report a measurement result satisfying the target trigger condition in a case in which the management operation is a management operation corresponding to the management information, the measurement result is reported to the network-side device only after the terminal performs the management operation on the target cell. In this way, after receiving the measurement result, the network-side device can modify configuration of air interface parameters, a modulation and coding level, and the like based on the measurement result, thereby improving quality of service.

In this embodiment of this disclosure, in order to make the terminal clearly know the type of the management operation, the configuration information further includes management information corresponding to the target trigger condition, and the performing a management operation on a target cell includes:
  performing a management operation corresponding to the management information on the target cell.

The management information is used to indicate the type of the management operation corresponding to the target trigger condition, and the type of the management operation includes, but is not limited to, at least one of addition, deletion, modification, and handover. In other words, the target trigger condition and the management information corresponding to the target trigger condition may be in a one-to-one correspondence or a one-to-many correspondence.

For example, if the management information corresponding to the target trigger condition indicates that the management operation type is a handover operation, the terminal performs a handover operation on the target cell, that is, a handover to the target cell.

It should be understood that, for other trigger conditions in the configuration information, the configuration information may also include management information corresponding to any one of the other trigger conditions.

In this way, the terminal can determine a management operation type of the management operation to be performed on the target cell, thereby improving accuracy of the cell management operation.

In this implementation, the network-side device may further limit the cells to be measured by the terminal. Optionally, the configuration information includes a cell list, and the measurement objects included in the configuration information include cells in the cell list.

The cell list may be understood as list information of to-be-measured cells, such as a white list (white List), used to indicate the cells that need to be measured. Further, the cell list may be included in the trigger condition in the configuration information, or may be included in the measurement object in the configuration information. This may be specifically determined according to actual needs, and is not limited in the embodiment of this disclosure.

In this way, the terminal may measure only the to-be-measured cells indicated by the cell list, so that a measurement range can be narrowed, improving measurement efficiency.

It should be noted that various optional implementations described in the embodiments of this disclosure may be implemented in combination with each other or may be implemented independently, which is not limited in the embodiments of this disclosure.

For ease of understanding, an embodiment in which the optional implementations are combined with each other is described as an example as follows.

Step 1: A network-side device configures configuration information of conditional cell management for UE, where content of the configuration information includes:
  a trigger condition (for example, an event 1) for triggering target cell management;
  management information (for example, a configuration 1) for managing a target cell after the condition is satisfied;
  to-be-measured target cell or frequency information (for example, a measurement object (for example, a measure Object 1)); and
  information about an association relationship between the "trigger condition" and the "to-be-measured target cell or frequency information", such as a measurement identifier (for example, a measure ID 1).

For example, the network-side device may configure a trigger condition list, which includes one or more "trigger conditions" (for example, an event 1 and an event 2). The network-side device may configure one or more pieces of "to-be-measured target cell or frequency information" (for example, a measure Object 1 and a measure Object 2). The "trigger condition" and the "target cell or frequency information" may be randomly combined by using the "association relationship information" (for example, a measure ID 1 identifies association between the event 1 and the measure Object 1; or a measure ID 2 identifies association between the event 2 and the measure Object 2).

Additionally, the network-side device configures or the protocol specifies indication information indicating whether measurement reporting needs to be performed after a trigger condition is satisfied. For example, the protocol may specify that for measurement corresponding to the "trigger condition for triggering target cell management", after the trigger condition is satisfied, a measurement result corresponding to the "trigger condition" does not need to be reported.

That "the network-side device configures or the protocol specifies indication information indicating whether measurement reporting needs to be performed after a trigger condition is satisfied" may include any one of the following:
  first indication information, indicating whether to report a measurement result corresponding to a specified "trigger condition for triggering target cell management" after the "trigger condition" is satisfied (for example, indicating whether to report a measurement result corresponding to the event 1); and
  second indication information, indicating whether to report a measurement result corresponding to a specified "trigger condition for triggering target cell management" after the specified "trigger condition" is satisfied and specified "configuration information" is executed (for example, indicating whether to report a corresponding measurement result in the case in which the event 1 is satisfied and the configuration 1 is executed).

Additionally, the network-side device configures the list information of the to-be-measured cells (for example, white List), and the list information of the cells may be included in the "trigger condition" information, or may be included in the "to-be-measured target cell or frequency information".

Step 2: Based on the configuration information in step 1, the UE measures a cell or frequency corresponding to the "to-be-measured target cell or frequency information" based on the information about the association relationship between the "trigger condition" and the "to-be-measured target cell or frequency information", for example, measures a frequency 1 indicated by the measure Object 1, with a measurement result being RSRP indicated in the event 1.

If the configuration information in step 1 indicates a list of cells that need to be measured, the UE performs measurement only for the indicated "cells that need to be measured".

If the configuration information in step 1 indicates that a measurement result needs (or does not need) to be reported, the UE reports (or does not report) the measurement result after a trigger condition is satisfied.

The method for cell management in this embodiment includes at least the following improvements:

A new trigger condition for conditional management cell is established, and the measurement identifier, the measurement object, and a trigger condition for cell management are used as trigger conditions for triggering measurement and cell management.

The indication information is used to control the UE whether to report the measurement result when the trigger condition is satisfied.

The cells to be measured are controlled by configuring the cell list.

By using the method for cell management in this embodiment, the UE can be controlled to perform corresponding measurement when a cell is managed in a conditional trigger mode; the UE can also be controlled whether to perform measurement reporting; and the cells to be measured by the UE can be limited. This can simplify operations of conditional cell management, reduce times of measurement reporting, narrow a measurement range, and improve measurement efficiency, thereby saving system resources.

Figure 4:
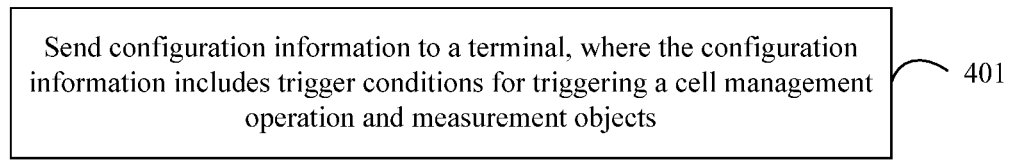
FIG. 4 is a flowchart 2 of a method for cell management according to an embodiment of this disclosure.

FIG. 4 is a flowchart 2 of a method for cell management according to an embodiment of this disclosure. The method for cell management in this embodiment is applied to a network-side device, and the network-side device may be a source node or a target node. As shown in FIG. 4, the method for cell management in this embodiment includes the following step:

Step 401: Send configuration information to a terminal, where the configuration information includes trigger conditions for triggering a cell management operation and measurement objects.

Optionally, the method for cell management may further include:

sending indication information to the terminal, to indicate whether to report a measurement result.

It should be understood that the indication information may be carried in the configuration information, thereby saving transmission signaling.

Optionally, the indication information is used to indicate whether to report a measurement result satisfying the trigger condition; or in a case in which the configuration information further includes management information, the indication information is used to indicate whether to report a measurement result satisfying the trigger condition in a case in which a management operation to be performed by the terminal is a management operation corresponding to the management information.

Optionally, the configuration information further includes information about an association between the trigger condition and the measurement object.

Optionally, the configuration information includes a cell list, and the measurement objects included in the configuration information include cells in the cell list.

It should be noted that this embodiment serves as an implementation of the network-side device corresponding to the foregoing method embodiment. Therefore, reference may be made to the related description in the foregoing method embodiment, and the same beneficial effects can be achieved. To avoid repetition, details are not described herein again.

Figure 5:
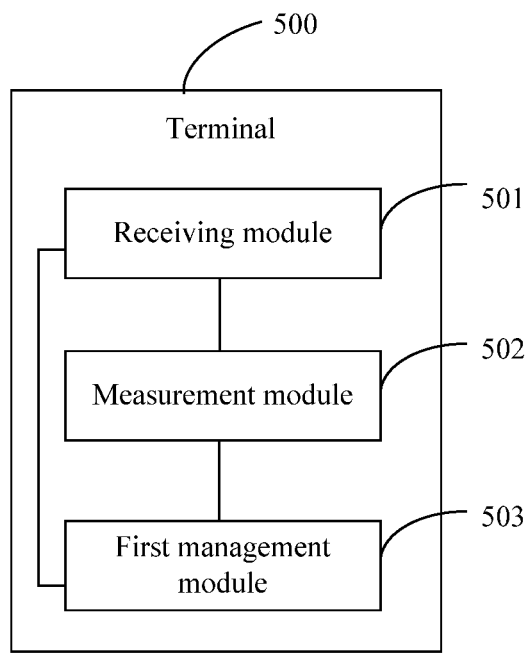
FIG. 5 is a structural diagram 1 of a terminal according to an embodiment of this disclosure.

FIG. 5 is a structural diagram 1 of a terminal according to an embodiment of this disclosure. As shown in FIG. 5, the terminal 500 includes:

a receiving module 501, configured to receive configuration information sent by a network-side device, where the configuration information includes trigger conditions for triggering a cell management operation and measurement objects;

a measurement module 502, configured to perform a measurement operation corresponding to a target trigger condition on a target measurement object, to obtain a measurement result; and a first management module 503, configured to: if the measurement result satisfies the target trigger condition, perform a management operation on a target cell, where the target measurement object is any one of the measurement objects included in the configuration information, and the target trigger condition is associated with the target measurement object.

Optionally, the target cell corresponds to the target measurement object.

On the basis of FIG. 5, the following describes modules further included in the terminal 500.

Optionally, the terminal 500 further includes:

a first obtaining module, configured to obtain indication information; and a second management module, configured to perform a target operation corresponding to the indication information for the obtained measurement result, where the indication information is used to indicate whether to report the measurement result, and the target operation is a reporting operation or an operation of skipping reporting.

Optionally, the indication information is used to indicate whether to report a measurement result satisfying the trigger condition.

Optionally, the configuration information further includes management information corresponding to the target trigger condition, and the indication information is used to indicate whether to report a measurement result satisfying the target trigger condition in a case in which the management operation is a management operation corresponding to the management information.

Optionally, the indication information is configured by the network-side device or specified by a protocol.

Optionally, the configuration information further includes information about an association between the trigger condition and the measurement object.

Optionally, the configuration information further includes management information corresponding to the target trigger condition.

The first management module 503 is specifically configured to: if the measurement result satisfies the target trigger condition, perform a management operation corresponding to the management information on the target cell.

Optionally, the configuration information includes a cell list, and the measurement objects included in the configuration information include cells in the cell list.

The terminal 500 can implement the procedures in the method embodiments of this disclosure, with the same beneficial effects achieved. To avoid repetition, details are not described herein again.

Figure 6:
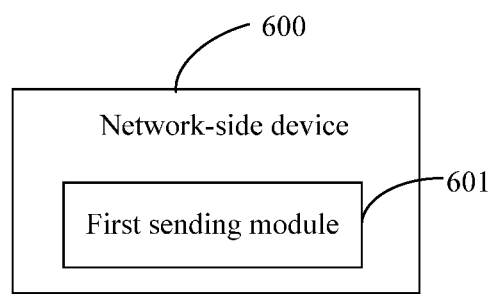
FIG. 6 is a structural diagram 1 of a network-side device according to an embodiment of this disclosure.

FIG. 6 is a structural diagram 1 of a network-side device according to an embodiment of this disclosure. As shown in FIG. 6, the network-side device 600 includes:

a first sending module 601, configured to send configuration information to a terminal, where the configuration information includes trigger conditions for triggering a cell management operation and measurement objects.

On the basis of FIG. 6, the following describes a module further included in the network-side device 600.

Optionally, the network-side device 600 further includes:

a second sending module, configured to send indication information to the terminal, to indicate whether to report a measurement result.

Optionally, the indication information is used to indicate whether to report a measurement result satisfying the trigger condition; or in a case in which the configuration information further includes management information, the indication information is used to indicate whether to report a measurement result satisfying the trigger condition in a case in which a management operation to be performed by the terminal is a management operation corresponding to the management information.

Optionally, the configuration information further includes information about an association between the trigger condition and the measurement object.

Optionally, the configuration information includes a cell list, and the measurement objects included in the configuration information include cells in the cell list.

The network-side device 600 can implement the procedures in the method embodiments of this disclosure, with the same beneficial effects achieved. To avoid repetition, details are not described herein again.

Figure 7:
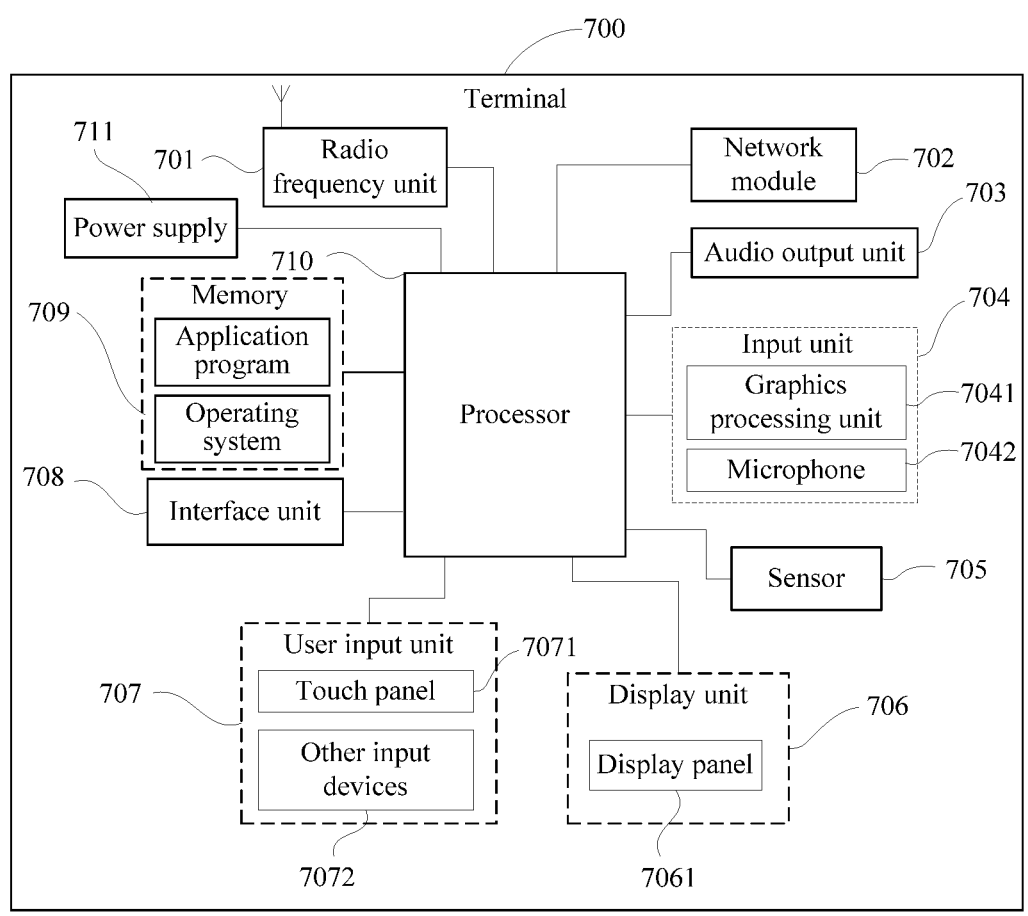
FIG. 7 is a structural diagram 2 of a terminal according to an embodiment of this disclosure.

FIG. 7 is a structural diagram 2 of a terminal according to an embodiment of this disclosure, and the terminal may be a schematic diagram of a hardware structure of a terminal for implementing the embodiments of this disclosure. As shown in FIG. 7, the terminal 700 includes, but is not limited to, a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that the terminal structure shown in FIG. 7 does not constitute a limitation to the terminal. The terminal may include more or fewer components than those shown in the figure, or a combination of some of the components, or a different arrangement of the components. In this embodiment of this disclosure, the terminal includes, but is not limited to, a mobile phone, a tablet computer, a notebook computer, a palmtop computer, an in-vehicle terminal, a wearable device, a pedometer, or the like.

The radio frequency unit 701 is configured to receive configuration information sent by a network-side device, where the configuration information includes trigger conditions for triggering a cell management operation and measurement objects.

The processor 710 is configured to perform a measurement operation corresponding to a target trigger condition on a target measurement object, to obtain a measurement result; and if the measurement result satisfies the target trigger condition, perform a management operation on a target cell, where the target measurement object is any one of the measurement objects included in the configuration information, and the target trigger condition is associated with the target measurement object.

Optionally, the target cell corresponds to the target measurement object.

Optionally, the processor 710 is further configured to:
obtain indication information; and
perform a target operation corresponding to the indication information for the obtained measurement result, where the indication information is used to indicate whether to report the measurement result, and the target operation is a reporting operation or an operation of skipping reporting.

Optionally, the indication information is used to indicate whether to report a measurement result satisfying the trigger condition.

Optionally, the configuration information further includes management information corresponding to the target trigger condition, and the indication information is used to indicate whether to report a measurement result satisfying the target trigger condition in a case in which the management operation is a management operation corresponding to the management information.

Optionally, the indication information is configured by the network-side device or specified by a protocol.

Optionally, the configuration information further includes information about an association between the trigger condition and the measurement object.

Optionally, the configuration information further includes management information corresponding to the target trigger condition, and the processor 710 is further configured to perform a management operation corresponding to the management information on the target cell.

Optionally, the configuration information includes a cell list, and the measurement objects included in the configuration information include cells in the cell list.

It should be noted that the terminal 700 in this embodiment can implement the procedures of the method embodiments in the embodiments of this disclosure, with the same beneficial effects achieved. To avoid repetition, details are not described herein again.

It should be understood that in this embodiment of this disclosure, the radio frequency unit 701 may be configured to receive and send signals in an information receiving/sending process or a call process; and specifically, after receiving downlink data from a base station, send the downlink information to the processor 710 for processing, and in addition, send uplink data to the base station. Generally, the radio frequency unit 701 includes, but is not limited to, an antenna, at least one amplifier, a transceiver, a coupler, a low noise amplifier, a duplexer, and the like. In addition, the radio frequency unit 701 may further communicate with a network and other devices through a wireless communications system.

The terminal provides wireless broadband internet access for a user by using the network module 702, for example, helps the user send and receive emails, browse web pages, and access streaming media.

The audio output unit 703 may convert audio data received by the radio frequency unit 701 or the network module 702 or stored in the memory 709 into an audio signal and output the audio signal as a sound. In addition, the audio output unit 703 may further provide audio output (for example, a call signal received sound or a message received sound) that is related to a specific function performed by the terminal 700. The audio output unit 703 includes a speaker, a buzzer, a telephone receiver, and the like.

The input unit 704 is configured to receive an audio or video signal. The input unit 704 may include a graphics processing unit (GPU) 7041 and a microphone 7042, and the graphics processing unit 7041 processes image data of a still picture or a video obtained by an image capture apparatus (for example, a camera) in an image capture mode or a video capture mode. A processed image frame may be displayed on the display unit 706. An image frame processed by the graphics processing unit 7041 may be stored in the memory 709 (or another storage medium) or sent by the radio frequency unit 701 or the network module 702. The microphone 7042 can receive a sound and can process such sound into audio data. The processed audio data can be converted into a format that can be sent to a mobile communication base station through the radio frequency unit 701 in a telephone call mode, for outputting.

The terminal 700 further includes at least one sensor 705, such as an optical sensor, a motion sensor, and other sensors. Specifically, the optical sensor includes an ambient light sensor and a proximity sensor, where the ambient light sensor can adjust luminance of a display panel 7061 based on brightness of ambient light, and the proximity sensor can turn off the display panel 7061 and/or backlight when the terminal 700 is moved to an ear. As a type of motion sensor, an accelerometer sensor can detect magnitudes of accelerations in all directions (usually three axes), can detect a magnitude and a direction of gravity when the mobile phone is in a static state, and can be applied to mobile phone posture recognition (such as screen switching between portrait and landscape, related games, and magnetometer posture calibration), functions related to vibration recognition (such as pedometer and tapping), and the like. The sensor 705 may also include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information input by the user or information provided for the user. The display unit 706 may include a display panel 7061, and the display panel 7061 may be configured in the form of a liquid crystal display (LCD), an organic light-emitting diode (OLED), or the like.

The user input unit 707 may be configured to receive input digit or character information and generate key signal input related to user setting and function control of the terminal. Specifically, the user input unit 707 includes a touch panel 7071 and other input devices 7072. The touch panel 7071, also referred to as a touchscreen, may capture a touch operation performed by a user on or near the touch panel (for example, an operation performed by the user on the touch panel 7071 or near the touch panel 7071 by using any appropriate object or accessory such as a finger or a stylus). The touch panel 7071 may include two parts: a touch detection apparatus and a touch controller. The touch detection apparatus detects a touch position of the user, detects a signal brought by a touch operation, and transmits the signal to the touch controller. The touch controller receives touch information from the touch detection apparatus, converts the touch information to point coordinates, and sends the point coordinates to the processor 710, and receives and executes a command sent by the processor 710. In addition, the touch panel 7071 may be implemented in a plurality of forms, for example, as a resistive, capacitive, infrared, or surface acoustic wave touch panel. The user input unit 707 may further include other input devices 7072 in addition to the touch panel 7071. Specifically, the other input devices 7072 may include but are not limited to a physical keyboard, a function key (such as a volume control key or a power on/off key), a trackball, a mouse, a joystick, and the like. Details are not described herein.

Further, the touch panel 7071 may cover the display panel 7061. After detecting a touch operation on or near the touch panel 7071, the touch panel 7071 transmits the touch operation to the processor 710 to determine a type of a touch event. Then the processor 710 provides corresponding visual output on the display panel 7061 based on the type of the touch event. In FIG. 7, the touch panel 7071 and the display panel 7061 serve as two independent components to implement input and output functions of the terminal. However, in some embodiments, the touch panel 7071 and the display panel 7061 may be integrated to implement the input and output functions of the terminal. This is not specifically limited herein.

The interface unit 708 is an interface for connecting an external apparatus to the terminal 700. For example, the external apparatus may include a wired or wireless headphone port, an external power (or battery charger) port, a wired or wireless data port, a memory card port, a port for connecting an apparatus provided with a recognition module, an audio input/output (I/O) port, a video I/O port, an earphone port, and the like. The interface unit 708 may be configured to receive input (for example, data information and electric power) from the external apparatus, and transmit the received input to one or more elements in the terminal 700; or may be configured to transmit data between the terminal 700 and the external apparatus.

The memory 709 may be configured to store software programs and various data. The memory 709 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 709 may include a high-speed random access memory, or may include a non-volatile memory, for example, at least one magnetic disk storage device, a flash memory device, or other volatile solid-state storage devices.

The processor 710 is a control center of the terminal, connects various parts of the entire terminal by using various interfaces and lines, and executes various functions and data processing of the terminal by running or executing a software program and/or a module stored in the memory 709 and invoking data stored in the memory 709, so as to perform overall monitoring on the terminal. The processor 710 may include one or more processing units. Optionally, the processor 710 may integrate an application processor and a modem processor. The application processor mainly processes an operating system, a user interface, an application program, and the like. The modem processor mainly processes wireless communication. It may be understood that the modem processor may alternatively not be integrated into the processor 710.

The terminal 700 may further include a power supply 711 (for example, a battery) that supplies power to each component. Optionally, the power supply 711 may be logically connected to the processor 710 by using a power management system, so as to implement functions such as charging management, discharging management, and power consumption management by using the power management system.

In addition, the terminal 700 may include some functional modules that are not shown. Details are not described herein.

Optionally, an embodiment of this disclosure further provides a terminal, including a processor 710, a memory 709, and a computer program stored in the memory 709 and capable of running on the processor 710. When the computer program is executed by the processor 710, the procedures of the foregoing embodiment of the method for cell management are implemented, with the same beneficial effects achieved. To avoid repetition, details are not described herein again.

Figure 8:
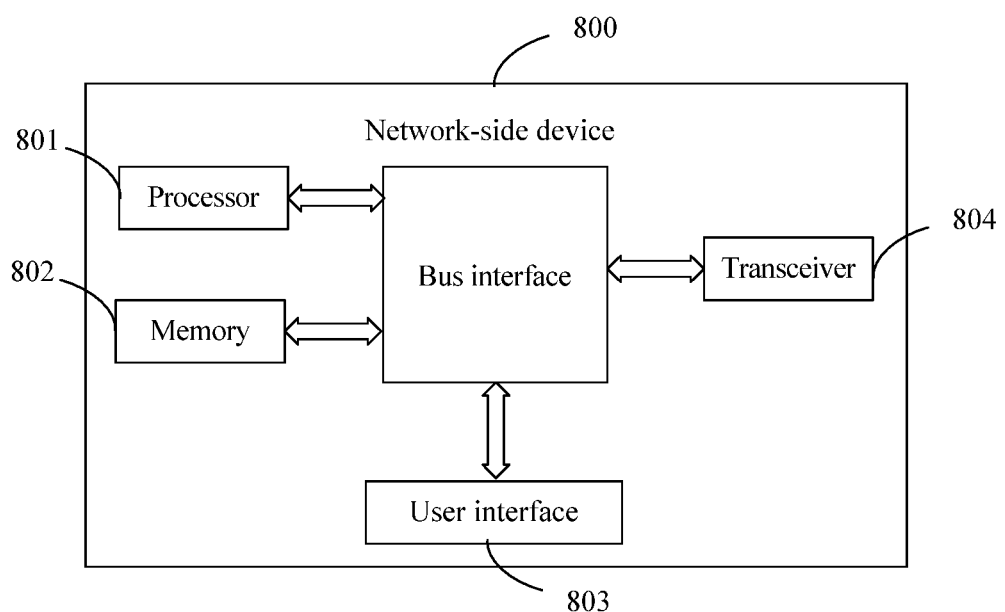
FIG. 8 is a structural diagram 2 of a network-side device according to an embodiment of this disclosure.

FIG. 8 is a schematic structural diagram 2 of a network-side device according to an embodiment of this disclosure. As shown in FIG. 8, the network-side device 800 includes a processor 801, a transceiver 802, a user interface 803, a transceiver 804, and a bus interface.

The transceiver 804 is configured to send configuration information to a terminal, where the configuration information includes trigger conditions for triggering a cell management operation and measurement objects.

Optionally, the transceiver 804 is further configured to send indication information to the terminal, to indicate whether to report a measurement result.

Optionally, the indication information is used to indicate whether to report a measurement result satisfying the trigger condition; or in a case in which the configuration information further includes management information, the indication information is used to indicate whether to report a measurement result satisfying the trigger condition in a case in which a management operation to be performed by the terminal is a management operation corresponding to the management information.

Optionally, the configuration information further includes information about an association between the trigger condition and the measurement object.

Optionally, the configuration information includes a cell list, and the measurement objects included in the configuration information include cells in the cell list.

In FIG. 8, a bus architecture may include any quantity of interconnected buses and bridges, and specifically connect together various circuits of one or more processors represented by the processor 801 and a memory represented by the memory 802. The bus architecture may further interconnect various other circuits such as a peripheral device, a voltage regulator, and a power management circuit. These are all well known in the art, and therefore are not further described in this specification. A bus interface provides interfaces. The transceiver 804 may be a plurality of elements, including a transmitter and a receiver, and provides units configured to perform communication with various other apparatuses over a transmission medium. For different user equipment, the user interface 803 may also be an interface that can be externally or internally connected to a required device. The connected device includes, but is not limited to, a keypad, a display, a speaker, a microphone, a joystick, or the like.

The processor 801 is responsible for management of the bus architecture and general processing, and the memory 802 may store data used by the processor 801 when the processor 801 performs an operation.

The network-side device 800 is capable of implementing the processes implemented by the network-side device in the method embodiment. To avoid repetition, details are not described herein again.

An embodiment of this disclosure further provides a computer-readable storage medium, where the computer-readable storage medium stores a computer program. When the computer program is executed by a processor, the procedures of the foregoing embodiments of the method for cell managements are implemented, with the same beneficial effects achieved. To avoid repetition, details are not described herein again. The computer-readable storage medium is, for example, a read-only memory (ROM), a random access memory (RAM), a magnetic disk, or an optical disc.

It should be noted that, in this specification, the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, a person skilled in the art can clearly understand that the method in the foregoing embodiments may be implemented by software on a necessary universal hardware platform or by hardware only. In most cases, the former is a more preferred implementation. Based on such an understanding, the technical solutions of this disclosure essentially, or a part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The embodiments of this disclosure are described above with reference to the accompanying drawings, but this disclosure is not limited to the foregoing implementations. The foregoing implementations are only illustrative rather than restrictive. Inspired by this disclosure, a person of ordinary skill in the art can still derive many variations without departing from the essence of this disclosure and the protection scope of the claims. All these variations shall fall within the protection of this disclosure.

What is claimed is:

1. A method for cell management, applied to a terminal, comprising:

receiving configuration information sent by a network-side device, wherein the configuration information comprises cell management operation trigger conditions, cell management information corresponding to the cell management operation trigger conditions, and measurement objects associated with the cell management operation trigger conditions;

performing, based on the received configuration information, a measurement operation corresponding to a target cell management operation trigger condition on a target measurement object, to obtain a measurement result, wherein the target measurement object is one of the measurement objects comprised in the configuration information, and the target cell management operation trigger condition is a corresponding one of the cell management operation trigger conditions associated with the target measurement object; and in response to determining that the measurement result satisfies the target cell management operation trigger condition and that indication information indicates not to report the measurement result determined to be satisfying the target cell management operation trigger condition, performing a target cell management operation on a target cell and skipping reporting the measurement result; the target cell management operation being a cell management operation indicated by target cell management information corresponding to the target cell management operation trigger condition.

2. The method according to claim 1, further comprising:

in response to determining that the measurement result satisfies the target cell management operation trigger condition and that indication information indicates to report the measurement result determined to be satisfying the target cell management operation trigger condition, performing the target cell management operation on the target cell and reporting the measurement result.

3. The method according to claim 1, wherein the indication information is configured by the network-side device or specified by a protocol.

4. The method according to claim 1, wherein the configuration information further comprises information about associations between the cell management operation trigger conditions and the measurement objects, and each association is identified by a measurement identifier.

5. The method according to claim 1, wherein the target cell management operation comprises at least one of cell addition, cell deletion, cell change, or cell handover.

6. The method according to claim 1, wherein the configuration information comprises a cell list, and the measurement objects comprised in the configuration information comprise cells in the cell list.

7. A method for cell management, applied to a network-side device, wherein the method comprises:
sending configuration information to a terminal, wherein the configuration information comprises cell management operation trigger conditions, cell management information corresponding to the cell management operation trigger conditions, and measurement objects associated with the cell management operation trigger conditions, to cause the terminal to perform, based on the received configuration information, a measurement operation corresponding to a target cell management operation trigger condition on a target measurement object, to obtain a measurement result, wherein the target measurement object is one of the measurement objects comprised in the configuration information, and the target cell management operation trigger condition is a corresponding one of the cell management operation trigger conditions associated with the target measurement object; and
sending indication information for indicating whether to report a measurement result, to cause the terminal to perform a target cell management operation on a target cell and to report the measurement result in response to determining that measurement result satisfies the target cell management operation trigger condition and that the indication information indicates to report the measurement result determined to be satisfying the target cell management operation trigger condition; the target cell management operation being a cell management operation indicated by target cell management information corresponding to the target cell management operation trigger condition.

8. The method according to claim 7, wherein the sending the indication information further comprises:
sending the indication information, to cause the terminal to perform the target cell management operation on the target cell and to report the measurement result in response to determining that measurement result satisfies the target cell management operation trigger condition and that the indication information indicates to report the measurement result determined to be satisfying the target cell management operation trigger condition.

9. The method according to claim 7, wherein the configuration information further comprises information about associations between the cell management operation trigger conditions and the measurement objects, and each association is identified by a measurement identifier.

10. The method according to claim 7, wherein the configuration information comprises a cell list, and the measurement objects comprised in the configuration information comprise cells in the cell list.

11. A terminal, comprising a processor, a memory, and a computer program stored in the memory and capable of running on the processor, wherein the processor is configured to execute the computer program to implement the method for cell management according to claim 1.

12. The terminal according to claim 11, wherein the target cell management operation comprises at least one of cell addition, cell deletion, cell change, or cell handover.

13. The terminal according to claim 11, wherein the indication information is configured by the network-side device or specified by a protocol.

14. The terminal according to claim 11, wherein the configuration information further comprises information about associations between the cell management operation trigger conditions and the measurement objects, and each association is identified by a measurement identifier.

15. The terminal according to claim 11, wherein the configuration information comprises a cell list, and the measurement objects comprised in the configuration information comprise cells in the cell list.

16. The method according to claim 7, wherein the target cell management operation comprises at least one of cell addition, cell deletion, cell change, or cell handover.

17. The method according to claim 7, wherein the sending indication information is performed by sending the configuration information comprising the indication information to the terminal.

18. The method according to claim 3, wherein in the case that the indication information is configured by the network-side device, the receiving configuration information sent by a network-side device comprises:
receiving the configuration information comprising the indication information sent by the network-side device.

19. A method for cell management, performed by a terminal, comprising:
receiving configuration information and indication information sent by a network-side device, wherein the configuration information comprises information about associations between cell management operation trigger conditions, cell management information corresponding to the cell management operation trigger conditions, and measurement objects, and each association is identified by a measurement identifier;
performing, based on the received configuration information, a measurement operation corresponding to a target cell management operation trigger condition in the cell management operation trigger conditions on a target measurement object, to obtain a measurement result, the target measurement object being one of the measurement objects comprised in the configuration information, and the target cell management operation trigger condition is identified by a same measurement identifier as the target measurement object; and
receiving an association relationship configuration information in which a measurement report configuration is associated with a measurement object by using a measurement identifier;
in response to determining that the measurement result satisfies the target cell management operation trigger condition and that the indication information indicates not to report the measurement result determined to be satisfying both a reporting condition of the measurement report configuration and the target cell management operation trigger condition, performing a target cell management operation on a target cell and skipping reporting the measurement result; the target cell management operation being a cell management operation indicated by target cell management information corresponding to the target cell management operation trigger condition.

* * * * *